United States Patent [19]
Cohen

[11] Patent Number: 5,873,892
[45] Date of Patent: Feb. 23, 1999

[54] THERMOMETRIC PACIFIER FOR INFANTS

[76] Inventor: Fredie Cohen, 26/4 Eisenberg Street, Rehovot 76289, Israel

[21] Appl. No.: 925,280

[22] Filed: Sep. 8, 1997

Related U.S. Application Data

[63] Continuation-in-part of Ser. No. 543,507, Oct. 16, 1995, abandoned, which is a continuation-in-part of Ser. No. 441,002, Mar. 28, 1995, abandoned.

[30] Foreign Application Priority Data

Jun. 26, 1994 [IL] Israel ......................................... 110125

[51] Int. Cl.⁶ ............................. A61J 17/00; G01K 01/08
[52] U.S. Cl. ............................................. 606/234; 374/151
[58] Field of Search ..................................... 606/234, 236; D24/194, 199; 215/11.1–11.6; 374/151

[56] References Cited

U.S. PATENT DOCUMENTS 4,878,588 11/1989 Ephraim .
4,930,902 6/1990 Yata et al. .
5,013,160 5/1991 Massey et al. .
5,176,704 1/1993 Berndt ...................................... 606/236
5,581,238 12/1996 Chang et al. ............................ 374/151

FOREIGN PATENT DOCUMENTS 62-117537 7/1987 Japan .

*Primary Examiner*—Glenn K. Dawson
*Attorney, Agent, or Firm*—Lowe Hauptman Gopstein Gilman & Berner

[57] ABSTRACT

A thermographic material is provided in the front side of a pacifier flange in an area thereof adapted to overlie the infant's chin while the infant sucks on the pacifier nipple. The flange material between the infant's chin and the thermographic material is body heat conductive. If the infant has a fever, the thermographic material is adapted to change appearance upon detection of a predetermined temperature representative of a fever condition.

14 Claims, 1 Drawing Sheet

THERMOMETRIC PACIFIER FOR INFANTS

RELATED APPLICATIONS

The present application is a continuation-in-part of prior application Ser. No. 08/543,507, filed on Oct. 16, 1995, entitled "THERMOMETRIC PACIFIER AND NIPPLE FOR INFANTS", ABANDONED the disclosure of which is incorporated by reference herein in its entirety; the '507 application being a continuation-in-part of prior application Ser. No. 08/441,002 filed on Mar. 28, 1995, entitled "THERMOMETRIC PACIFIER AND NIPPLE FOR INFANTS, ABANDONED."

TECHNICAL FIELD

The present invention is directed to an apparatus for detecting either excessively high body temperature (e.g. fever) in an infant. More particularly, the present invention is directed to a pacifier or nipple displaying a signal indicative of a temperature or range of temperatures.

BACKGROUND ART

The importance of the earliest detection of a rise in the body-temperature of a human being is well known. It is particularly important to detect a rise in temperature of an infant. Typically, when an infant is in the hospital, the infant's body temperature is regularly monitored, commonly utilizing a mercurial or electronic thermometer rectally. Even at home, a parent or caregiver is often asked to verify the body temperature of the infant, again usually rectally. This method of detecting body temperature is unpleasant for both the infant and the caregiver, causing discomfort for the infant and distress for the caregiver.

It is thus desirable to provide a convenient, hygienic and objective means for continuously monitoring the body temperature of an infant.

DISCLOSURE OF THE INVENTION

The present invention, in a preferred embodiment, is a pacifier including a nipple and a flange with a handle optionally attached to the flange. A preferably thermographic material is applied to the outer surface of the flange. The flange is heat conductive. Under normal body temperature, the thermographic material preferably remains opaque or dark. However, when body temperature rises to a range indicative of fever (e.g. 37°–38° C. or 38.1° C. or higher for a high fever), the body heat conducted through the flange is operable to act upon the opaque display of the thermographic material and render the display transparent or clear and thereby reveal a hidden message in the form of an ideogram and/or pictograph and/or icon and/or alphanumeric display, all of which are indicative of a fever.

The flange will preferably have a thickness of 0.4 mm or other suitable thickness in a portion thereof that separates the thermographic material from direct contact with the infant's chin or other areas surrounding the mouth while allowing heat to be conducted from the inside surface of the flange in contact with the infant's chin or face to the outside surface on which the thermographic material is disposed.

It is also possible and therefore within the scope of this invention to substitute the thermographic material with liquid crystals.

The thermographic material may be disposed in one or more recesses formed in the outer surface of the flange and protectively covered or otherwise sealed with a transparent material.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 3:
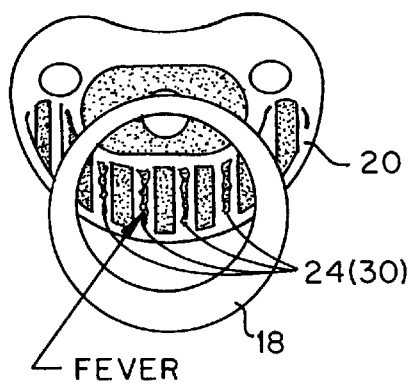
FIG. 3 is a view similar to FIG. 1 depicting the FIG. 1 embodiment in a fever detection mode of representation.
Figure 4:
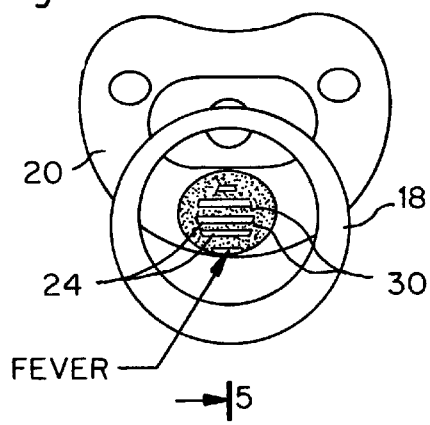
FIG. 4 is a view similar to FIG. 2 depicting the FIG. 2 embodiment in a fever mode of thermal detection.
Figure 5:
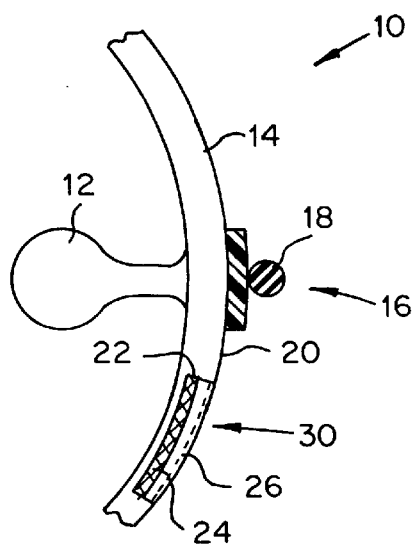
FIG. 5 is a view taken along the line 5—5 of FIG. 4.

Referring to FIGS. 1–5, a pacifier 10 includes a nipple 12, a flange 14 and a plug assembly 16 which may optionally include a handle 18. Conventional materials may be used to form the flange and nipple. According to the invention, an outer surface 20 of the flange 14 is preferable formed with a recess or indentation 22 containing a thermographic material (or liquid crystals) 24. The thermographic material 24 is temperature sensitive and may, for example, be opaque at one temperature and either change color or become transparent at or above a higher predetermined temperature. Optionally, the thermographic material 24 may be sealed within the recess or indentation 22 in the flange outer surface 20 by means of a transparent material 26 (e.g.Locktite, manufactured by Locktite, Inc.) as best depicted in FIG. 5.

Figure 1:
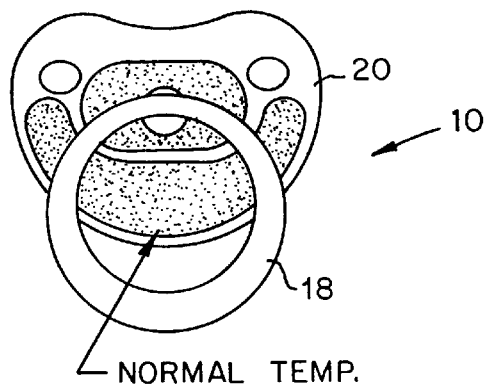
FIG. 1 is a front plan view of a pacifier according to a preferred embodiment of the present invention.
Figure 2:
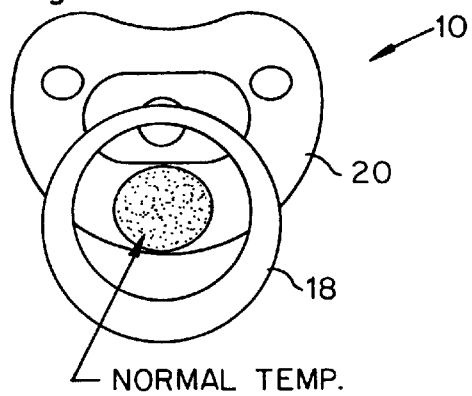
FIG. 2 is a view similar to FIG. 1 of a second preferred embodiment.

Referring to FIGS. 1 and 2, an opaque display including the thermographic material 24 may be applied in a predetermined shape to simulate, for example, a smiley face when seen in plan view (see FIG. 1). The entire surface of the opaque display is preferably formed from the thermographic material 24. When a predetermined temperature indicative of fever is detected, the entire surface of the opaque display becomes transparent which reveals therebeneath either an icon or other type of display such as a series of colored bars (e.g. colored yellow and red) respectively identified with reference numerals 24 and 30 in FIG. 3.

In a preferred embodiment of this invention, the yellow and red bars 24, 30, or other icons for visually observable indicia, is printed on a paper or like substrate which is then covered with the thermographic material. The thermographic material may be coated onto the paper substrate or adhesively secured thereto by means of an adhesive backing layer.

Examples of suitable thermographic materials that can be used in the present invention are CHROMAZONE, manufactured by Davis Liquid Crystals Inc. San Leandro, Calif.; CHROMICOLOR manufactured by Matsui Chemical Corporation, Ltd., Kyoto, Japan; or THERMACHROME manufactured by Polymertech Inc., Tokyo, Japan. Other types of thermographic materials can be used. These materials typically come with an adhesive backing layer. Optionally, however, adhesive material can be coated onto the thermographic material.

The flange material or the thickness thereof separating the thermographic material 24 from the user's chin or face is heat conductive so that the body temperature of the infant can thermally contact and affect the thermographic material if a predetermined temperature is exceeded. For example, the thermographic material 24 used in the opaque display of FIGS. 1 and 2 may be selected so that it remains opaque or dark under normal body temperature (e.g. 36°–36.9° C.). However, if body temperature increases to a fever range (at or above 37° C.), the thermographic material 24 becomes transparent or clear to reveal a hidden message in the form of an ideogram, pictograph, icon, or alphanumeric display, such as depicted in FIGS. 3 and 4, both of which are representative of fever.

Accordingly, in the preferred embodiment of pacifier 10, the pacifier is not really a thermometer as much as it is a fever alarm. Indeed, once fever is detected with pacifier 10, the use of a thermometer may be advisable to detect actual temperature.

Of course, it is within the scope of this invention to utilize different types of thermographic material 24 and/or liquid crystals which are respectively responsive to different temperature ranges. For example, it may be possible to utilize one type of thermographic material 24 that changes color or shading at a temperature indicative of a high fever (e.g. 38.1° C. or greater) and another type of material that changes color when a normal fever is detected (e.g. 37°–38° C.).

Preferably about 0.4 mm of flange wall thickness separates the thermographic material 29 from direct contact with the infant's chin or other face areas. This thickness is sufficiently thin to enable body heat to be transmitted through the flange 14 to act upon the thermographic material 24.

It will be readily seen by one of ordinary skill in the art that the present invention fulfills all of the objects set forth above. After reading the foregoing specification, one of ordinary skill will be able to effect various changes, substitution of equivalents and various other aspects of the invention as broadly modified for any appropriate ranges of temperature and display features. It is therefore intended that the protection granted hereon be limited only by the definition contained in the appended claims and equivalents thereof.

What is claimed is:

1. A pacifier, comprising:
   a. a nipple;
   b. a flange having opposite front and rear sides with the nipple projecting rearwardly from the rear side; and
   c. a material disposed in the front side of said flange, said material being responsive to heat conducted through the flange and being operable to change its visual appearance upon detection of a predetermined temperature,
   wherein said material is dark or opaque at temperatures below said predetermined temperature and becomes transparent or clear to assume a transparent mode upon being subjected to at least said predetermined temperature.

2. The pacifier of claim 1, wherein said material is a thermographic material.

3. The pacifier of claim 1, wherein said material is liquid crystals.

4. The pacifier of claim 1, further comprising indicia located on said flange and being representative of at least one of an ideogram, a pictograph, an icon, and an alphanumeric display, said indicia being visually observable only when said material is in its transparent mode.

5. The pacifier of claim 1, wherein said predetermined temperature is representative of a fever condition.

6. The pacifier of claim 5, wherein said predetermined temperature is at least about 37° C.

7. The pacifier of claim 1, further comprising a layer of transparent material covering the heat responsive material.

8. The pacifier of claim 7, wherein said heat responsive material and transparent covering material are both disposed in a shallow recess formed in the front side of the flange.

9. A pacifier, comprising:
   a. a nipple;
   b. a flange having opposite front and rear sides with the nipple projecting rearwardly from the rear side; and
   c. a material disposed in the front side of said flange, said material being responsive to heat conducted through the flange and being operable to chance its visual appearance upon detection of a predetermined temperature,
   wherein the front side of said flange has an indentation or shallow recess in which the material is disposed.

10. The pacifier of claim 9, wherein the portion of said flange between the bottom of the recess and the backside of the flange constitutes a separating wall operable to transmit body heat from the user to the material.

11. The pacifier of claim 10, wherein the thickness of said separating wall is about 0.4 mm.

12. The pacifier of claim 10, wherein said nipple is configured so that the separating wall is adapted to contact the user's chin.

13. The pacifier of claim 12, wherein the nipple is configured so that the separating wall is adapted to contact an area of the user's face adjacent the user's mouth.

14. The pacifier of claim 9, further comprising a transparent layer of material covering the heat responsive material.

\* \* \* \* \*